(12) United States Patent
Sörvik

(10) Patent No.: US 9,485,922 B2
(45) Date of Patent: Nov. 8, 2016

(54) MARKING DEVICE AND HARVESTING ARRANGEMENT FOR TREE HARVESTING

(76) Inventor: Bengt Sörvik, Uppsala (SE)

( * ) Notice: Subject to any disclaimer, the term of this patent is extended or adjusted under 35 U.S.C. 154(b) by 1094 days.

(21) Appl. No.: 13/521,654

(22) PCT Filed: Jan. 12, 2010

(86) PCT No.: PCT/SE2010/050020
§ 371 (c)(1),
(2), (4) Date: Jul. 11, 2012

(87) PCT Pub. No.: WO2011/087405
PCT Pub. Date: Jul. 21, 2011

(65) Prior Publication Data
US 2012/0291918 A1 Nov. 22, 2012

(51) Int. Cl.
| A01G 23/00 | (2006.01) |
| B41K 1/08 | (2006.01) |
| B65B 61/26 | (2006.01) |
| B44B 5/00 | (2006.01) |
| A01G 23/083 | (2006.01) |

(52) U.S. Cl.
CPC ............... *A01G 23/00* (2013.01); *B41K 1/08* (2013.01); *B44B 5/0076* (2013.01); *B65B 61/26* (2013.01); *A01G 23/083* (2013.01)

(58) Field of Classification Search
CPC ............... A01G 23/099; A01G 23/00; B41K 1/08–1/12; B41K 5/02–5/026; B41J 1/06; B41J 1/58; B41J 1/04; B41J 3/38; B41J 3/385; B41J 3/4073; B65B 61/26; B44B 5/0076
See application file for complete search history.

(56) References Cited

U.S. PATENT DOCUMENTS
2006/0096667 A1  5/2006  Stevens et al.

FOREIGN PATENT DOCUMENTS
| WO | 02/13597 | 2/2002 |
| WO | 2009/134201 | 11/2009 |
| WO | 2009/151374 | 12/2009 |

*Primary Examiner* — Matthew G Katcoff
(74) *Attorney, Agent, or Firm* — Dilworth & Barrese, LLP

(57) ABSTRACT

The invention relates to a marking device for applying a code marking on a piece of wood. The marking device comprises several adjustable marking members, each of which comprising a marking element which is capable of applying a mark on a piece of wood and which is shiftable between different positions or states so as to allow a variation of the code marking to be applied by the marking device. At least one of said marking members (170) comprises a rotatable marking element (171), which is arranged to apply a rotationally unsymmetrical mark on a piece of wood and which is settable in different rotational positions in relation to the marking elements of the other marking members. The invention also relates to a harvesting arrangement for tree harvesting comprising such a marking device.

16 Claims, 13 Drawing Sheets

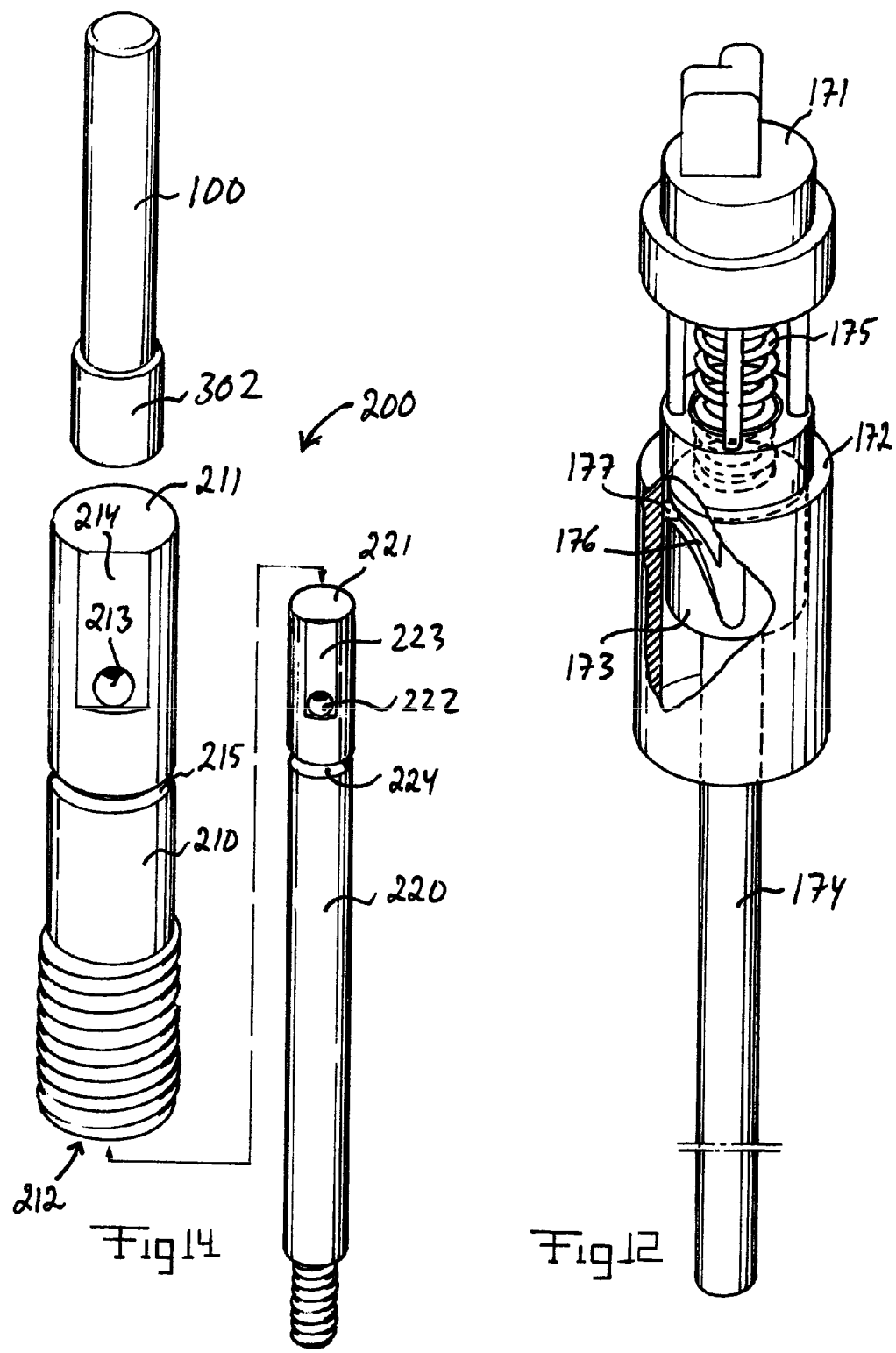

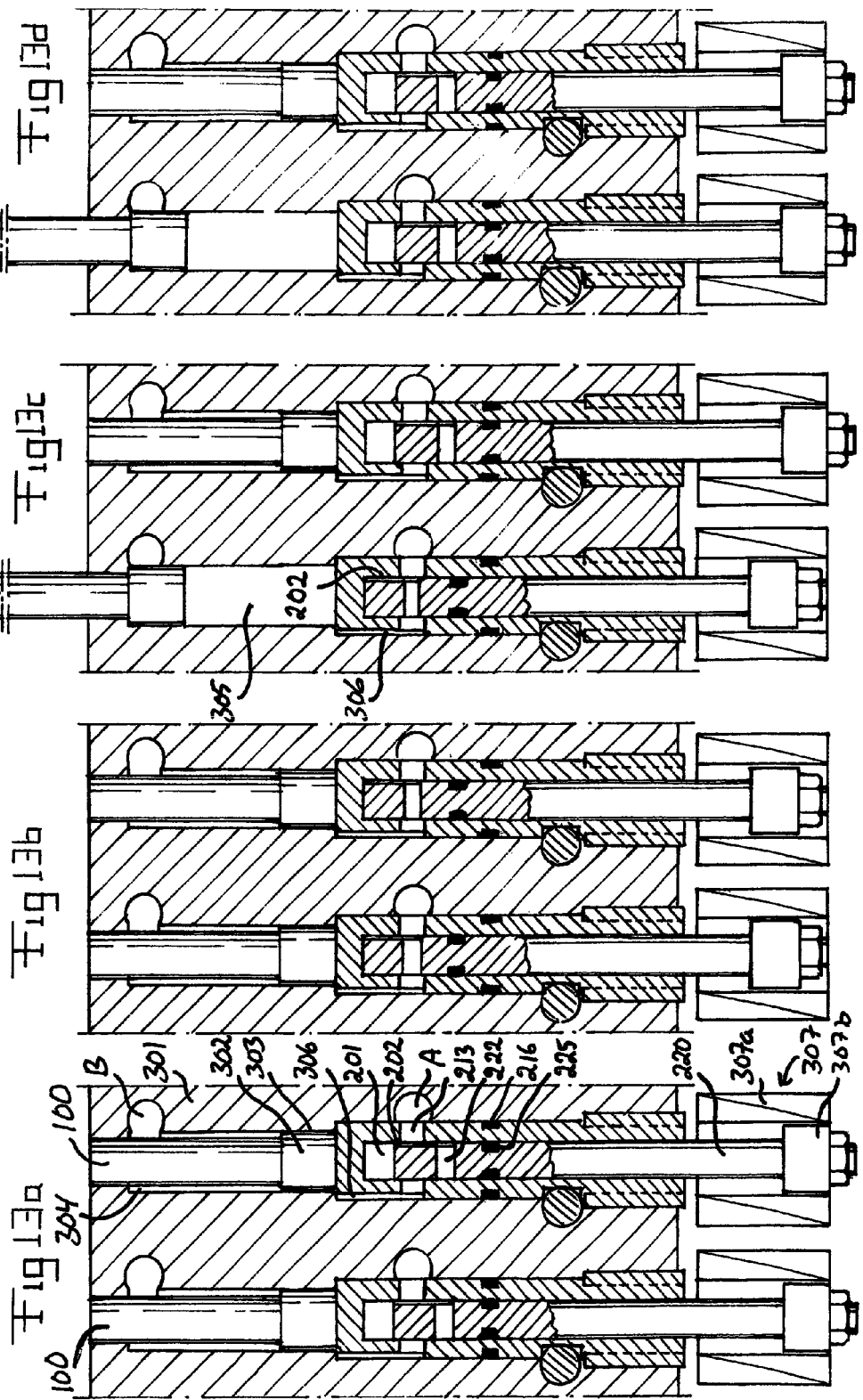

MARKING DEVICE AND HARVESTING ARRANGEMENT FOR TREE HARVESTING

FIELD OF THE INVENTION AND PRIOR ART

The present invention relates to a marking device according to the preamble of claim 1 for applying a code marking on a piece of wood. The invention also relates to a harvesting arrangement provided with such a marking device.

From WO 99/23873 A1 is previously known a system enabling a rational forest harvesting. According to one aspect of this system, the forest harvesting is carried out by means of a harvesting machine comprising a vehicle and a harvesting arrangement mounted thereon, the vehicle being provided with a computer arrangement adapted to register quality and/or size concerning harvested logs. In connection with the felling of a tree, the position of the harvesting machine is determined, for instance by means of a GPS-equipment, and a log obtained from the tree is marked by a marking device with this position information or a code by means of which the log is associatable to the position information. The position information or the code applied on a log may be stored in a database associated with data concerning quality and/or size of the log in question. In this way, it will be possible to treat the logs as products having an identity of origin. For an efficient implementation of this type of system, there is a need for a marking device which makes it possible to apply an identification marking on a log in a simple and rapid manner in connection with the harvesting.

SUMMARY OF THE INVENTION

The object of the present invention is to provide a marking device of new and favourable design for applying a marking on a piece of wood, for instance on the end surface of a log.

According to the invention, this object is achieved by a marking device having the features defined herein; and The marking device of the present invention comprises several adjustable marking members, each of which comprising a marking element which is capable of applying a mark on a piece of wood and which is shiftable between different positions or states so as to allow a variation of the code marking to be applied by the marking device. At least one of said marking members comprises a rotatable marking element, which is arranged to apply a rotationally unsymmetrical mark on a piece of wood and which is settable in different rotational positions in relation to the marking elements of the other marking members. Due to the fact that there is a possibility to use more than two different rotational positions for each rotatable marking element, the use of such rotational marking elements will make it possible to improve the variability of the code marking that can be applied by the marking device.

Further advantages as well as advantageous features of the marking device of the present invention will appear from the following description.

The invention also relates to a harvesting arrangement having the features defined herein.

Further advantages as well as advantageous features of the harvesting arrangement of the present invention will appear from the following description.

BRIEF DESCRIPTION OF THE DRAWINGS

With reference to the appended drawings, a specific description of preferred embodiments of the invention cited as examples follows below. In the drawings:

FIG. 12 is a schematic, partly cut perspective view illustrating a marking member with a rotatable marking element, FIGS. 13a-d are schematic sectional views illustrating different steps in a process of setting the positions of two regulating elements included in a marking device according to an embodiment of the present invention, FIG. 14 is a schematic, exploded view illustrating a regulating element and a hydraulic valve for controlling the position thereof.

DETAILED DESCRIPTION OF PREFERRED EMBODIMENTS OF THE INVENTION

The marking device according to the present invention may be used in a harvesting arrangement in order to apply a code marking on the end surface of a crosscut end of a tree trunk held by the gripping members of the harvesting arrangement. In the following, the marking device will be described with reference to this utilization. However, this utilization is only to be regarded as a non-limiting example and the marking device according to the invention may of course also be used for many other applications in order to apply a code marking on a piece of wood.

Figure 1:
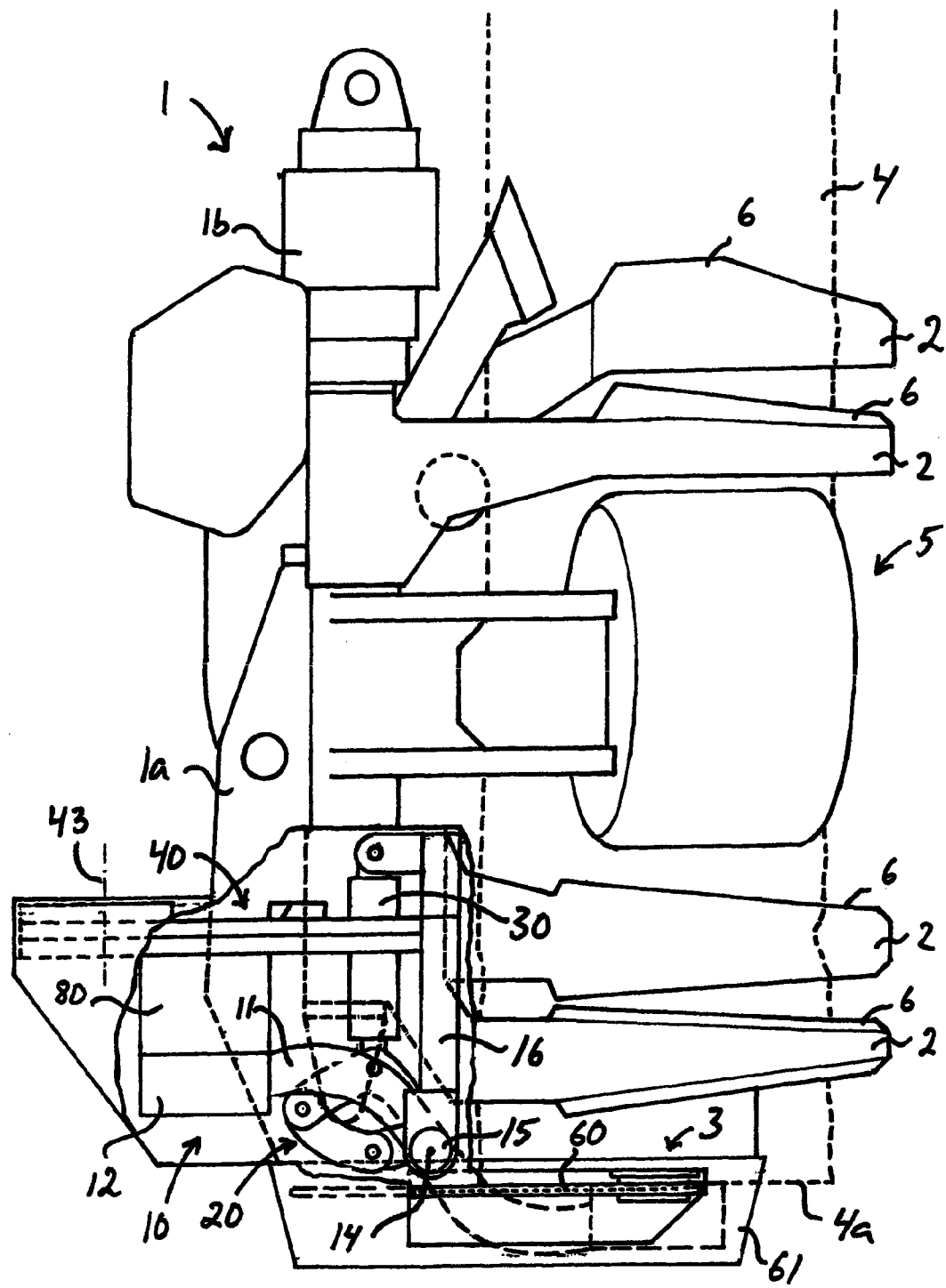
FIG. 1 is a schematic lateral view illustrating a harvesting arrangement provided with a marking device according to an embodiment of the present invention, with the harvesting arrangement in the position for holding a tree trunk in a vertical direction.

FIG. 1 schematically illustrates a harvesting arrangement 1 for tree harvesting, which in a conventional manner is intended to be carried by a crane mounted to a forest vehicle. The forest vehicle may for instance constitute a harvester. In the illustrated example, the harvesting arrangement 1 is a so-called one grip harvesting arrangement, i.e. a harvesting arrangement adapted to grip a standing tree by means of gripping members 2, cut the tree by means of a cutting device 3, lay the tree trunk 4 down to an essentially horizontal position (see FIG. 2), and then by means of feeding means 5 drive the tree trunk through the harvesting arrangement while simultaneously delimbing the tree trunk by means of delimbing members 6. In the illustrated example, the delimbing members 6 consist of delimbing knives arranged on the gripping members 2. In the illustrated example, the feeding means 5 of the harvesting arrangement comprises two rotatably driven feeding wheels 5a, 5b adapted to come into engagement with the tree trunk on opposite sides thereof. The tree trunk 4 may be crosscut into individual logs by means of the cutting device 3.

Figure 2:
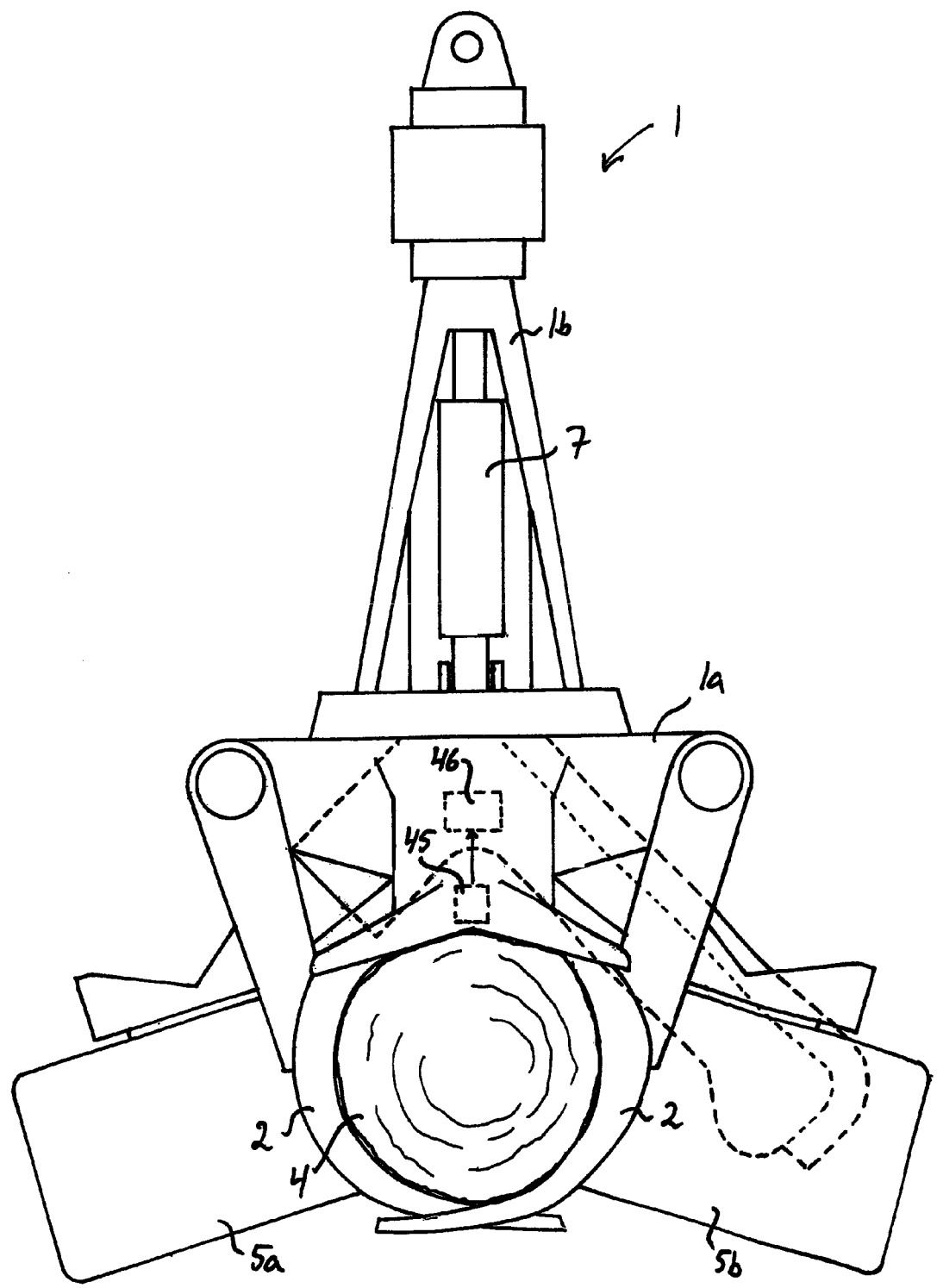
FIG. 2 is a schematic front view of the harvesting arrangement according to FIG. 1, as seen in the position when the tree trunk has been turned to a horizontal position.

In FIG. 1, the harvesting arrangement 1 is shown with a crosscut tree trunk 4 (indicated with broken lines) held by the gripping members 2 with the tree trunk extending in vertical direction. In FIG. 2, the harvesting arrangement 1 and a tree trunk 4 held therein are shown after the harvesting arrangement has laid the tree trunk down to horizontal position. The manoeuvring from vertical to horizontal position is carried out by means of a power member 7 in the form of a hydraulic cylinder, which is adapted to turn the part 1a of the harvesting arrangement in which the tree trunk 4 is held in relation to the other part 1b of the harvesting arrangement that is attached to the crane of the forest vehicle. With respect to the parts described so far, the harvesting arrangement 1 is of conventional design.

The harvesting arrangement 1 comprises a marking device 10 for applying a code marking on the end surface 4a of a crosscut end of a tree trunk 4 held by the gripping members 2. Thus, a log to be formed from a tree trunk 4 that is processed by means of the harvesting arrangement 1 may be provided with a code marking by means of this marking device 10. The code marking is applied on the frontal end surface of the log before the log is cut off from the tree trunk 4 and allowed to fall to the ground from the harvesting arrangement 1. The code marking is suitably associated to established and stored information as to the growth location of the tree from which the log is obtained, for instance in a manner described in WO 99/23873 A1, so as to make it possible to determine the place of origin of a marked log with the aid of the marking. In connection with the felling, information concerning the place of origin, quality, size, seller, buyer etc. of the log can be stored associated to the code marking, in which case such information can be retrieved in connection with a later reading of the code marking. The code marking can also be utilized in order to follow the movement of the log from the felling to the final customer.

Figure 6:
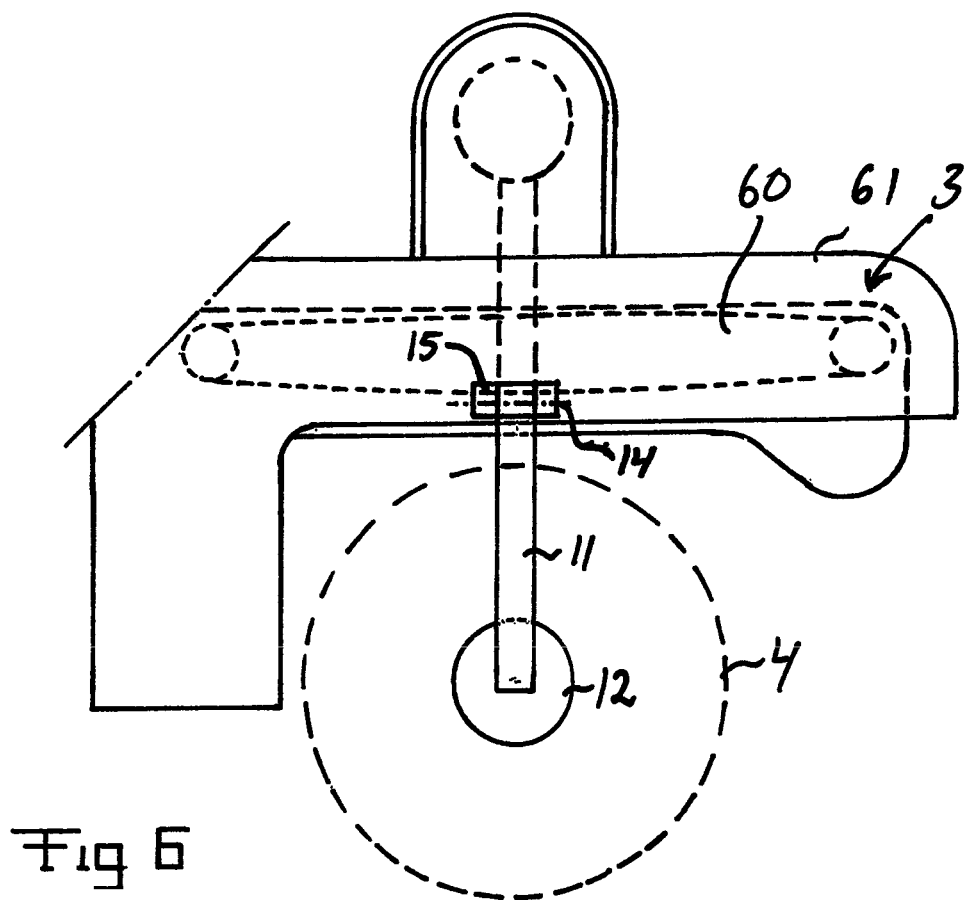
Figure 7:
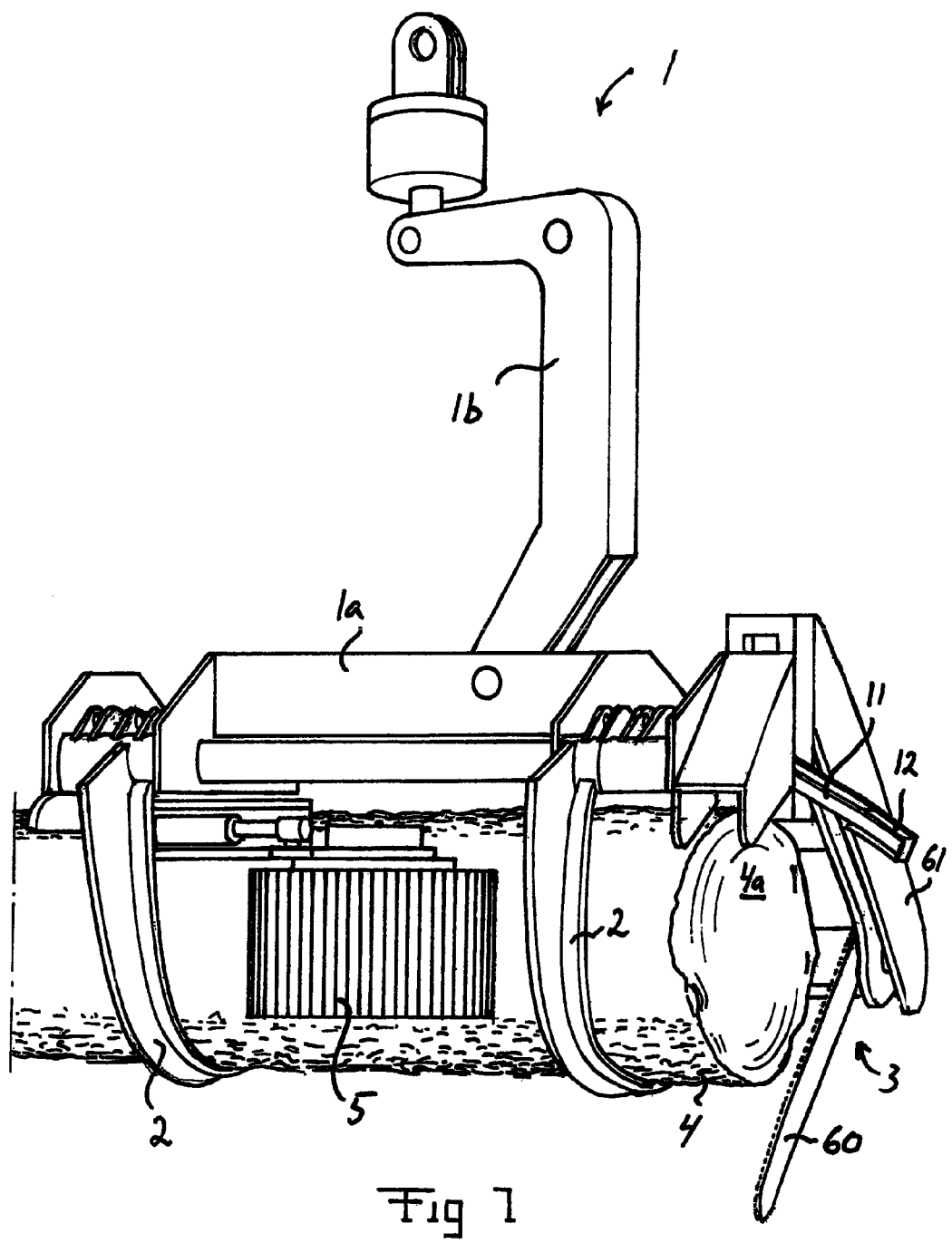
FIG. 7 is a schematic perspective view illustrating a harvesting arrangement provided a marking device according to an embodiment of the present invention.
Figure 8:
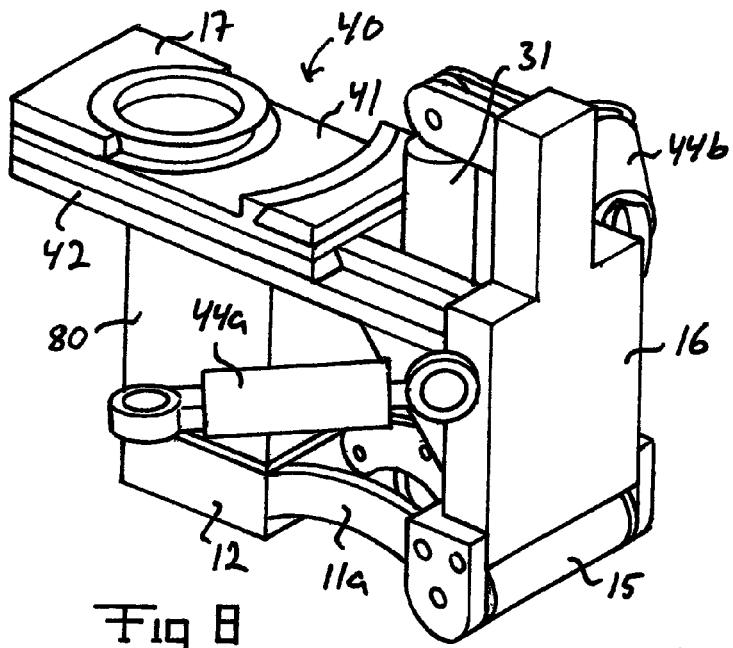
FIG. 8 is a perspective view illustrating the marking device of FIG. 3a and its movable support.
Figure 9:
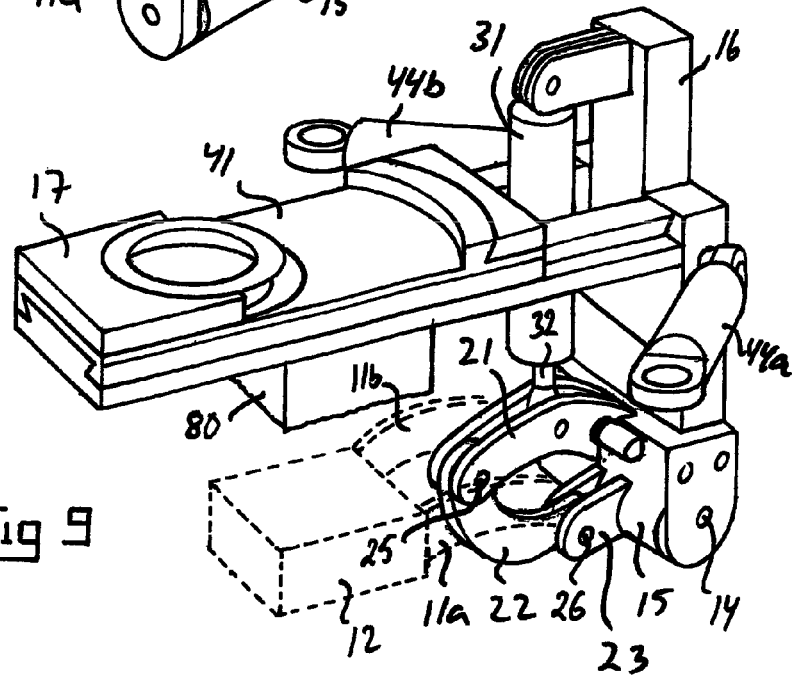
FIG. 9 is a perspective view illustrating parts included in the marking device and the movable support of FIG. 8.

In the illustrated embodiments, the marking device 10 comprises a striking arm 11 provided with a striking head 12 at its outer free end, the striking arm 11 being fixedly secured to a rotatably mounted shaft 15 at its inner end. In the embodiments illustrated in FIGS. 4, 5 and 7-9, the striking arm 11 comprises two parallel shanks 11a, 11b extending between the shaft 15 and the striking head 12, but the striking arm 11 could alternatively comprise one single shank extending between the shaft 15 and the striking head 12, as illustrated in FIG. 6.

The striking arm 11 is actuated by means of an actuating member 30, 30'. The striking arm 11 is pivotable, under the effect of the actuating member 30, 30', about an axis of rotation 14 from a resting position (see FIG. 3a) to a striking position (see FIG. 3b) so as to thereby allow the striking head 12 to hit against the end surface 4a of a crosscut end of a tree trunk held by the gripping members 2 in order to apply a code marking on said end surface. The axis of rotation 14 extends perpendicularly to the longitudinal direction of a tree trunk 4 held by the gripping members 2. In FIG. 1, the striking arm 11 and the striking head 12 are shown in continuous lines in the resting position and in broken lines in the striking position. When they are in the resting position, the striking arm 11 and the striking head 12 are out of the way of a tree trunk 4 held by the gripping members 2 and the tree trunk may then be advanced forwards along the harvesting arrangement 1 by the feeding means 5 without being obstructed by the striking arm 11 or the striking head 12.

The actuating member 30, 30' is suitably arranged to act on the striking arm 11 through a link arrangement 20, which is configured to accelerate the striking arm 11 during the final part of the striking arm's travel path from the resting position to the striking position. The link arrangement 20 is with advantage also configured to decelerate the striking arm 11 during the final part of the striking arm's travel path from the striking position to the resting position. In the illustrated embodiments, the link arrangement 20 comprises three links 21-23 arranged in series with each other between a base 16 and the shaft 15.

In the embodiments illustrated in FIGS. 1-9, the actuating member 30 is a hydraulic cylinder, which has a cylinder part 31 articulately connected to the base 16 and a piston rod 32 articulately connected to a link 21 of the link arrangement 20.

Figure 10:
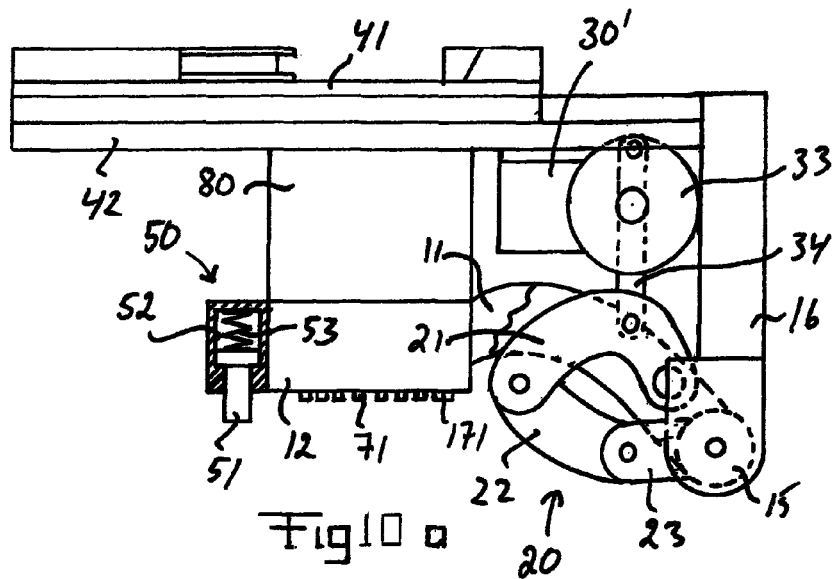
FIG. 10a is a schematic, partly cut lateral view illustrating an alternative type of marking device according to the present invention, as seen with the striking arm of the marking device in a resting position.
FIG. 10b shows the marking device of FIG. 10a with the striking arm in a striking position.
Figure 10:
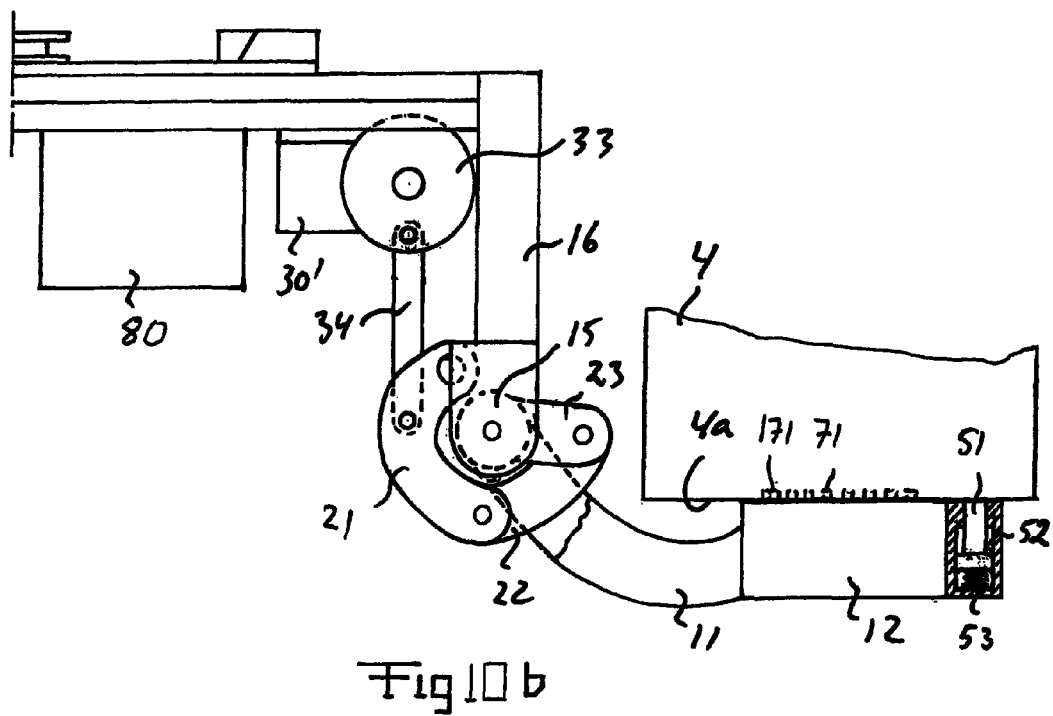

In the embodiment illustrated in FIGS. 10a and 10b, the actuating member 30' is a hydraulic motor or pump, which is arranged to act on the link arrangement 20 through a flywheel 33 and a reciprocating actuating rod 34. The flywheel 33 is connected to the output shaft of the hydraulic motor/pump 30', directly or through a gear, so as to be driven in rotation by the hydraulic motor/pump. The actuating rod 34 is at one end articulately connected to the flywheel 33 and at the other end articulately connected to a link 21 of the link arrangement 20. The flywheel 33 is arranged to transfer the rotating motion of the output shaft of the hydraulic motor/pump 30' into a reciprocating motion of the actuating rod 34. During one revolution of the flywheel 33, the actuating rod 34 is advanced and retracted so as to make the striking arm 11 move from the resting position (see FIG. 10a) to the striking position (see FIG. 10b) and then back to the resting position. The flywheel 33 is balanced in a suitable manner so as to affect the striking motion of the striking arm 11 in an appropriate manner.

The marking device 10 is with advantage secured to a movable support 40, which is movably mounted to the harvesting arrangement 1 so as to allow an adjustment of the position of the striking arm 11 in relation to the end surface 4a of a crosscut end of a tree trunk 4 held by the gripping members 2. In the embodiments illustrated in FIGS. 1-5 and 8-9, the striking arm 11 and the actuating member 30 are mounted to a base 16, which in its turn is secured to the movable support 40. The illustrated support 40 comprises two mutually connected parts 41, 42. A first part 41 is rotatably mounted to a frame part 17 of the harvesting arrangement 1 so as to be rotatable in relation to the frame part 17 about an axis of rotation 43 extending essentially in parallel with the longitudinal axis of a tree trunk held by the gripping members 2 of the harvesting arrangement. The base 16 is fixedly secured to the second part 42 of the support, which second part 42 is displaceably mounted to the first part 41 so as to be displaceable in a direction perpendicular to said axis of rotation 43. The rotation of the first and second parts 41, 42 in relation to the frame part 17 and the displacement of the second part 42 in relation to the first part 41 is accomplished by means of suitable actuating members 44a, 44b. In the illustrated embodiment, a first actuating member 44a in the form of a hydraulic cylinder is arranged on a first side of the second part 42 of the support and a second actuating member 44b in the form of a hydraulic cylinder is arranged on the opposite side of the second part 42 of the support. The respective actuating member 44a, 44b is at one end articulately connected to the base 16 and at its other end articulately connected to a part of the harvesting arrangement 1 which is fixed in relation to the frame part 17. The position of the marking device 10 and thereby the position of the striking head 12 in relation to the end surface 4a of a tree trunk held by the gripping members 2 may be adjusted by means of these actuating members 44a, 44b.

The harvesting arrangement 1 suitably comprises diameter establishing means 45 of any suitable type (schematically indicated in FIG. 2) for establishing information as to the diameter of a tree trunk held by the gripping members 2, and an electronic control unit 46 (schematically indicated in FIG. 2) which is arranged to control the above-mentioned actuating members 44a, 44b of the movable support 40 in dependence on information as to the diameter of a tree trunk 4 held by the gripping members 2 so as to thereby adjust the position of the striking head 12 in relation to the end surface 4a of the tree trunk in dependence on the diameter of the tree trunk.

The marking device 10 is suitably mounted between the cutting device 3 and the feeding means 5. In the illustrated embodiments, the cutting device 3 comprises a pivotally arranged saw sword 60 having a saw chain extending around its periphery. The saw sword 60 is in a conventional manner arranged in a so-called saw box 61, which is intended to protect the saw sword and its driving equipment from impacts. The saw sword 60 is in a conventional manner pivotable from a resting position inside the saw box 61 (see FIGS. 4-6) to a swung-out position in which the saw sword 60 protrudes outside the saw box (see FIG. 7). The saw sword 60 will be in the swung-out position at the moment when the saw sword has cut through a tree trunk held by the gripping members 2, and will thereafter be returned to the resting position before the tree trunk is fed forwards by the feeding means 5. The marking device 10 is preferably so designed that the striking arm 11 may be moved from its resting position to its striking position and then back to the resting position during the short period of time when the saw sword 60 is in the swung-out position. Hereby, the striking arm 11 is allowed to execute its striking motion before the saw sword 60 is returned to its resting position inside the saw box 61 after having cut through a tree trunk.

The striking head 12 is provided with adjustable marking members 70, 170 for achieving the desired code marking, each of which comprising a marking element 71, 171 which is capable of applying a mark on a piece of wood and which is shiftable between different positions or states so as to allow a variation of the code marking to be applied by the marking device. The marking device 10 comprises a regulating unit 80, by means of which said marking elements 71, 171 are shiftable between different positions or states. The striking head 12 and regulating unit 80 are movable in relation to each other into a setting position (see FIGS. 3a, 8, 10a, 15a and 15b) in which the regulating unit 80 and the striking head 12 is in contact with each other so as to allow the regulating unit 80 to set the positions or states of said marking elements 71, 171.

In the illustrated embodiments, the regulating unit 80 is separated from the striking arm 11 so as to be unaffected by the pivotal movement of the striking arm 11 when the striking arm is pivoted from the resting position to the striking position. In this case, the regulating unit 80 will not pivot together with the striking head 12 when the striking arm 11 is pivoted about the axis of rotation 14 under the effect of the actuating means 30, 30'. The striking head 12 is in this case movable in relation to the regulating unit 80 and the setting position is achieved by moving the striking head into contact with the regulating unit.

According to the present invention, at least one of said marking members comprises a rotatable marking element 171 (see FIGS. 11 and 12), which is arranged to apply a rotationally unsymmetrical mark on a piece of wood and which is settable in different rotational positions in relation to the marking elements of the other marking members 70, 170. The striking head 12 may be provided with several such rotatable marking elements 171. In the embodiment illustrated in FIGS. 11 and 12, the respective rotatable marking element 171 is rotatable about its longitudinal axis and arranged to apply an L-shaped mark on a piece of wood. Said mark could also have any other suitable rotationally unsymmetrical shape, such as for instance T-shape. The rotatable marking element 171 illustrated in FIG. 12 is arranged to apply a mark on a piece of wood by stamping or punching. Thus, this marking element 171 is intended to penetrate into the surface of a piece of wood hit by the striking head 12 so as to achieve an indentation in the surface.

The respective rotatable marking element 171 is preferably arranged to be rotated step by step with a given rotational angle between each step, for instance 45° or 90°. In the embodiment illustrated in FIG. 12, the marking element 171 is mounted to a rotatable sleeve 172 so as to be fixed in rotation in relation to this sleeve. The sleeve 172 is rotatably mounted in the striking head 12 but fixed in axial position to the striking head so as to be allowed to rotate inside the striking head but prevented from being displaced axially inside the striking head. Thus, the marking element 171 is rotatable together with the sleeve 172 in relation to the other marking elements 71, 171 provided in the striking head. The marking element 171 may be removably mounted to the sleeve 172 so as to allow a damaged marking element to be replaced by a new one. A cylindrical guide member 173 is received inside the sleeve 171. This guide member 173 is displaceably mounted in the striking head 12 but fixed in rotary position to the striking head so as to be allowed to be displaced axially inside the striking head but prevented from being rotated inside the striking head. The guide member 173 is fixedly connected to a pin 174, which extends from the end of the guide member facing away from the marking element 171. The guide member 173 is axially displaceable towards the marking element 171 by an axial displacement of the pin 174 and against the action of a spring 175, which is mounted between the guide member 173 and the marking element 171. A guide track 176 is provided in the envelop surface of the guide member 173. This guide track 176 extends all around the guide member 173. One or several projections 177 are provided on the inner surface of the sleeve 172, the respective projection 177 being received in the guide track 176 of the guide member 173. The guide track 176 have such a configuration that a displacement of the guide member 173 towards the marking element 171 will be transferred to a given rotational movement of the sleeve 172 and thereby of the marking element 171 via the projections 177 received in the guide track 176. The guide member 173 is returned to its retracted starting position by the spring 175 when the pushing force exerted by the pin 174 ceases.

The striking head 12 is preferably also provided with marking members 70 comprising a marking element 71 (see FIGS. 11 and 15a-15b) which is shiftable by means of the regulating unit 80 between an active marking position, in which the marking element 71 is arranged to apply a mark on a piece of wood hit by the striking head 12, and an inactive position, in which the marking element 71 is prevented from applying a mark on a piece of wood hit by the striking head 12. In the example illustrated in FIGS. 15a and 15b the respective marking element 71 is advanced when it is in the active position and retracted when it is in the inactive position. In its advanced active position the marking element 71 projects forwards from a front plate 91 of the housing of the striking head 12 and in its retracted inactive position the marking element does not project forwards from this front plate 91. The striking head 12 is provided with locking means 92 (see FIGS. 16a and 16b) for locking the marking elements 71 in their advanced active position so as to thereby allow them to penetrate into a piece of wood to be marked when the striking head hits it. In the illustrated example, the respective marking element 71 is movable from its retracted inactive position to its advanced active position against the action of a spring 72 arranged in the striking head.

In the illustrated example, the locking means 92 comprises a locking plate 93, which is mounted in the striking head 12 and which is laterally displaceable to and fro between an unlocking position (see FIGS. 15a and 16b), in which the locking plate 93 is arranged to allow said marking elements 71 to move between the advanced active position and the retracted inactive position, and a locking position (see FIGS. 15b and 16a), in which the locking plate 93 is arranged to engage with the marking elements 71 so as to lock them in the positions set by means of the regulating unit 80. The respective marking element 71 extends through a hole 95 in the locking plate 93, which hole has such a large diameter that the marking element 71 is allowed to move up and down in the hole 95 when the locking plate is in its unlocking position. In the illustrated example, the respective marking element 71 is provided with an upper annular recess 73a and a lower annular recess 73b. The locking plate 93 is arranged to be received in the upper annular recess 73a in order to lock the marking element 71 in its retracted inactive position and to be received in the lower annular recess 73b in order to lock the marking element 71 in its advanced active position.

The respective rotatable marking element 171 extends through a hole 95' in the locking plate 93, which hole has such a dimension that the locking plate 93 does not engage with the marking element 171 in any of the two positions of the locking plate.

Figure 16A:
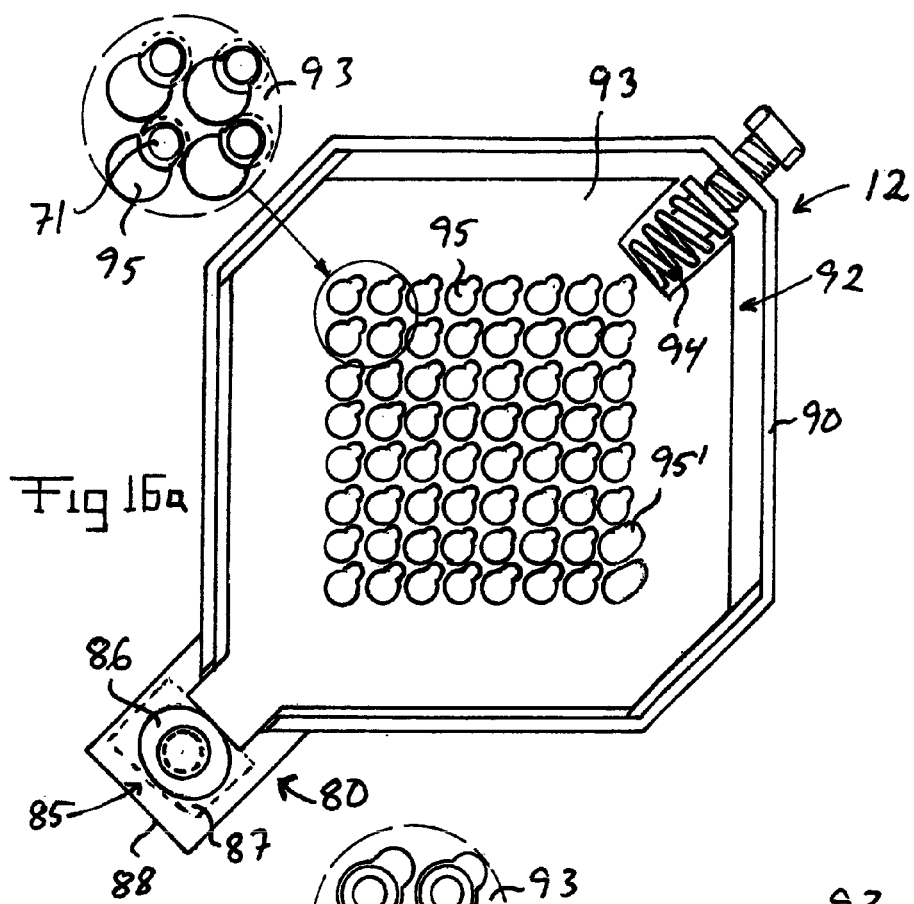
FIGS. 16a and 16b are schematic, partly cut planar views of a marking device according to an embodiment of the present invention, with a locking plate of the marking device shown in two different positions.
Figure 16B:
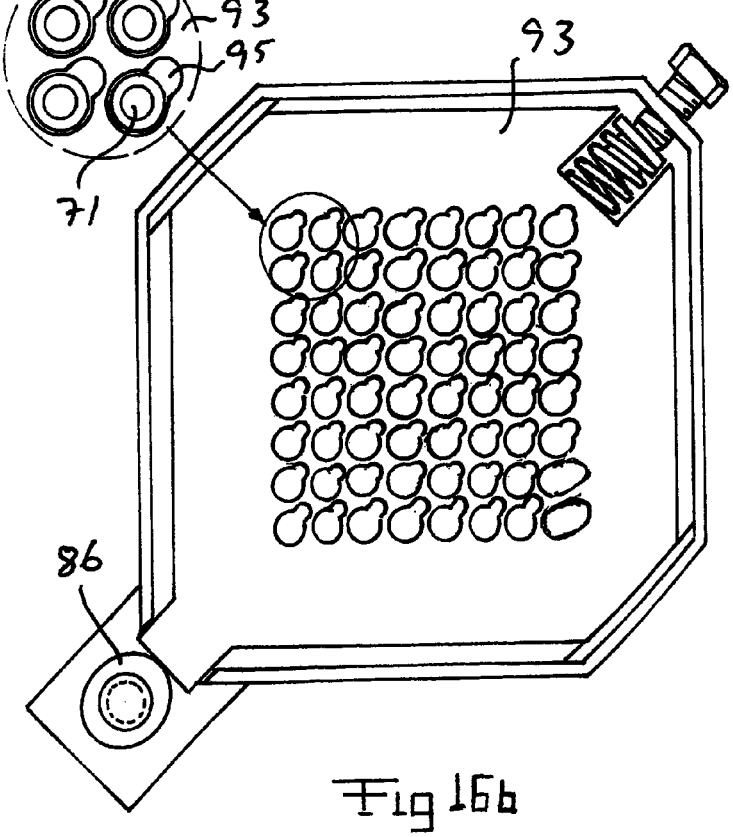

The locking plate 93 is movable from the unlocking position to the locking position under the effect of a spring member 94 mounted in the housing 90 of the striking head 12 (see FIGS. 16a and 16b). The regulating unit 80 is provided with an actuating member 85 by means of which the locking plate 93 is displaceable from its locking position to its unlocking position against the action of said spring member 94 when the striking head 12 is in the setting position. In the illustrated example, said actuating member 85 comprises a rotatable cam 86, which is arranged to act on the locking plate 93 in order to move the locking plate from the locking position to the unlocking position against the action of said spring member 94. The cam may for instance be rotated by means of hydraulic motor 87 mounted in the housing 88 of the regulating unit. The cam 86 is arranged to come into contact with the locking plate 93 when the striking head 12 is in contact with the regulating unit 80.

The regulating unit 80 comprises regulating elements 100 (see FIGS. 13a-13d, 15a and 15b) mounted in the housing 88 of the regulating unit for controlling the positions of the marking elements 71, 171, each marking element 71, 171 being allotted its own regulating element 100. The respective regulating element 100 is slidably mounted inside the housing 88 and the displacement of the regulating element 100 may be controlled by an actuating element 307 and a hydraulic valve 200 in the manner described below with reference to FIGS. 13a-13d and 14. The respective regulating element 100 is displaceable to and fro between an advanced position and a retracted position. In the advanced position the upper part of the regulating element 100 extends through a hole provided in the front plate 89 of the housing of the regulating unit and into a hole provided in the rear plate 96 of the housing of the striking head 12 so as to come into contact with the bottom of the associated marking element 71, 171.

The respective hydraulic valve 200 comprises a sleeve 210 with a closed end 211 and an open end 212, and a valve pin 220 which extends into the sleeve through the open end thereof and is slidably mounted to the sleeve while delimiting a chamber 201 inside the sleeve between the closed end 211 of the sleeve and the upper end 221 of the valve pin. The part of the valve pin 220 received in the sleeve is provided with a through hole 222, which extends in the radial direction of the valve pin. The valve pin 220 is axially displaceable between an advanced position, in which said through hole 222 is aligned with a corresponding hole 213 extending radially through the sleeve 210 so as to allow hydraulic fluid to flow across the sleeve through said holes 213, 222, and a retracted position, in which said through hole 222 is out of alignment with said hole 213 of the sleeve so as to prevent hydraulic fluid from flowing across the sleeve through said holes 213, 222. Said chamber 201 is in fluid communication with said holes 213, 222 through a narrow flow passage 202 inside the sleeve. In the illustrated example, the flow passage is formed by a recess 223 in the valve pin extending between the through hole 222 and the upper end 221 of the valve pin. The recess 223 preferably extends externally on one side of the valve pin. The hydraulic valve 200 is open when the valve pin 220 is in the advanced position and closed when the valve pin is in the retracted position. When hydraulic fluid is forced into the chamber 201 through the flow passage 202, the valve pin 220 will be displaced from the advanced position to the retracted position by the hydraulic pressure in the chamber 201 and the valve will thereby be automatically closed. The valve pin 220 is provided with an annular recess 224 for receiving a sealing member 225 in the form of an O-ring. This sealing member 225 forms a fluid tight seal between the valve pin and the sleeve. The sleeve 210 is on its outside provided with an annular recess 215 for receiving a sealing member 216 in the form of an O-ring.

The respective hydraulic valve 200 forms part of a hydraulic arrangement of the type illustrated in FIGS. 13a-13d, which hydraulic arrangement is mounted inside the housing 88 of the regulating unit 80. In FIGS. 13a-13d two hydraulic arrangements mounted to a common frame 301 are shown. Each hydraulic arrangement comprises a piston 302 slidably mounted in a bore 303 in the frame 301 while separating two chambers 304, 305 in the bore, a first chamber 304 being formed on the piston stem side of the piston and a second chamber 305 being formed on the opposite side of the piston. A first set of channels A are provided in the frame 301, through which hydraulic fluid is allowed to flow into and out of the second chamber 305 of the respective hydraulic arrangement when the hydraulic valve 200 of the hydraulic arrangement is open. A second set of channels B are provided in the frame 301, through which hydraulic fluid is allowed to flow into and out of the first chamber 304 of the respective hydraulic arrangement. The piston 302 is movable in a first direction by supplying hydraulic fluid to the first chamber 304 and in the opposite direction by supplying hydraulic fluid to the second chamber 305. The sleeve 210 of the hydraulic valve 200 included in the respective hydraulic arrangement is positioned below the associated piston 302 in the bore, said second chamber 305 being formed between the piston 302 and the closed end 211 of the sleeve. The second chamber 305 is in fluid communication with the hole 213 in the sleeve through a flow passage 306, which extends between the outer surface of the sleeve 210 and the inner surface of the bore 303. In the illustrated example, the flow passage is formed by a recess 214 in the sleeve 210 extending externally on one side of the sleeve between the hole 213 and the closed end 211 of the sleeve. The sealing member 216 forms a fluid tight seal between the sleeve 210 and the bore 303. The respective valve pin 220 is displaceable by means of an actuating element 307. In the illustrated example, the respective actuating element 307 comprises a solenoid 307a and a permanent magnet 307b. The solenoid 307a is fixed in relation to the frame 301 and the permanent magnet 307b is secured to a part of the valve pin 220 extending into the solenoid 307a.

Figure 3A:
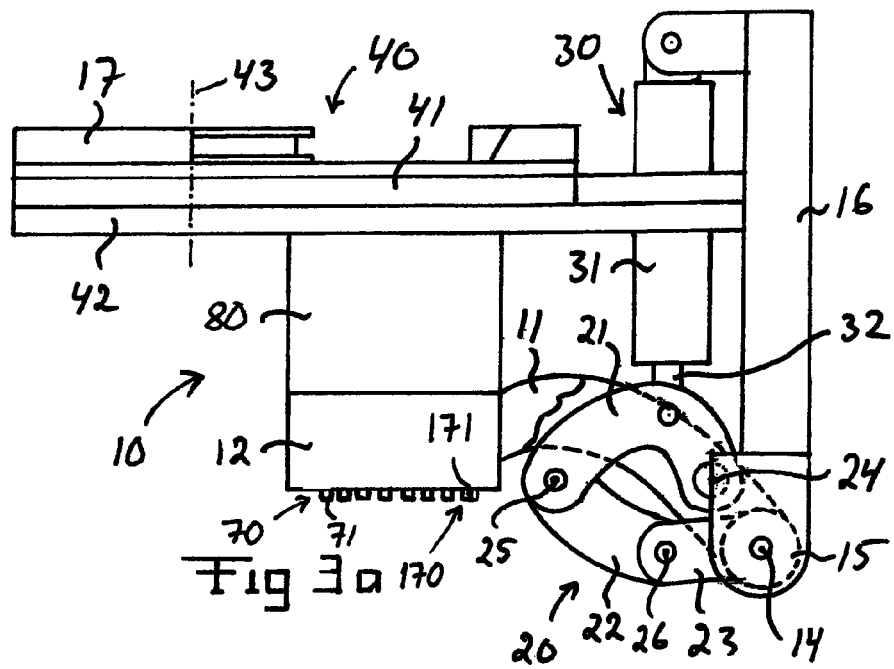
FIG. 3a is a schematic lateral view illustrating the marking device included in the harvesting arrangement of FIG. 1, as seen with the striking arm of the marking device in a resting position.
Figure 3B:
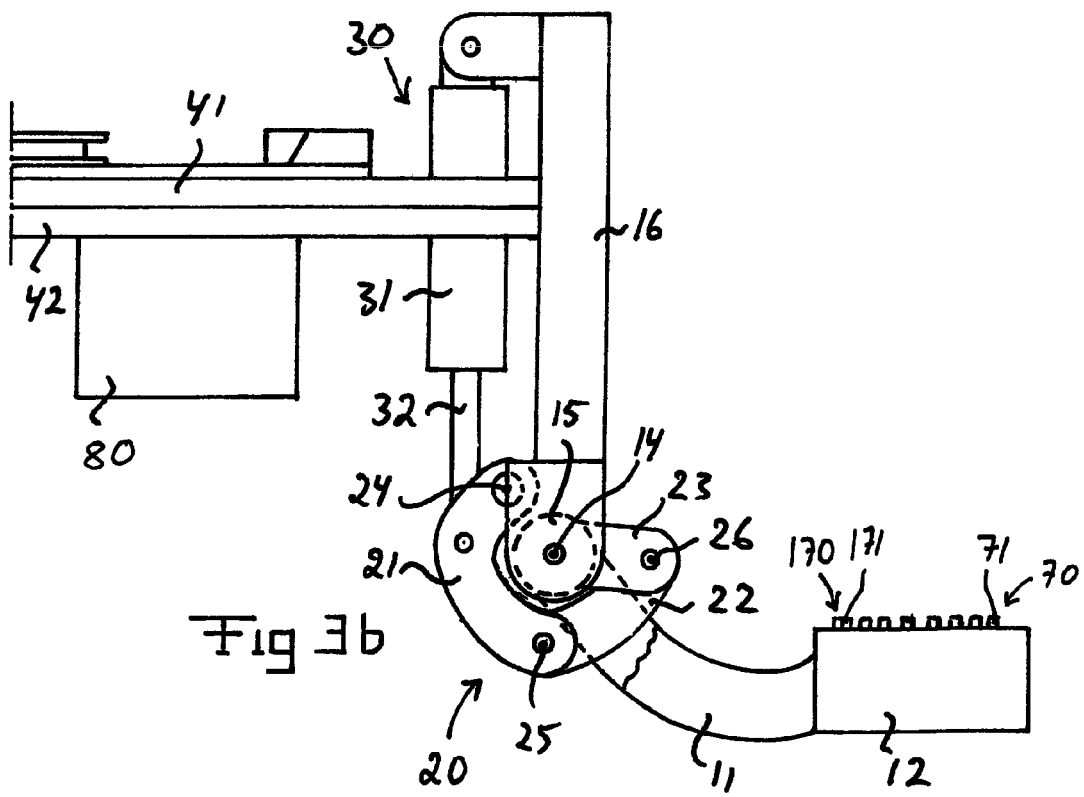
FIG. 3b shows the marking device of FIG. 3a with the striking arm in a striking position.
Figure 4:
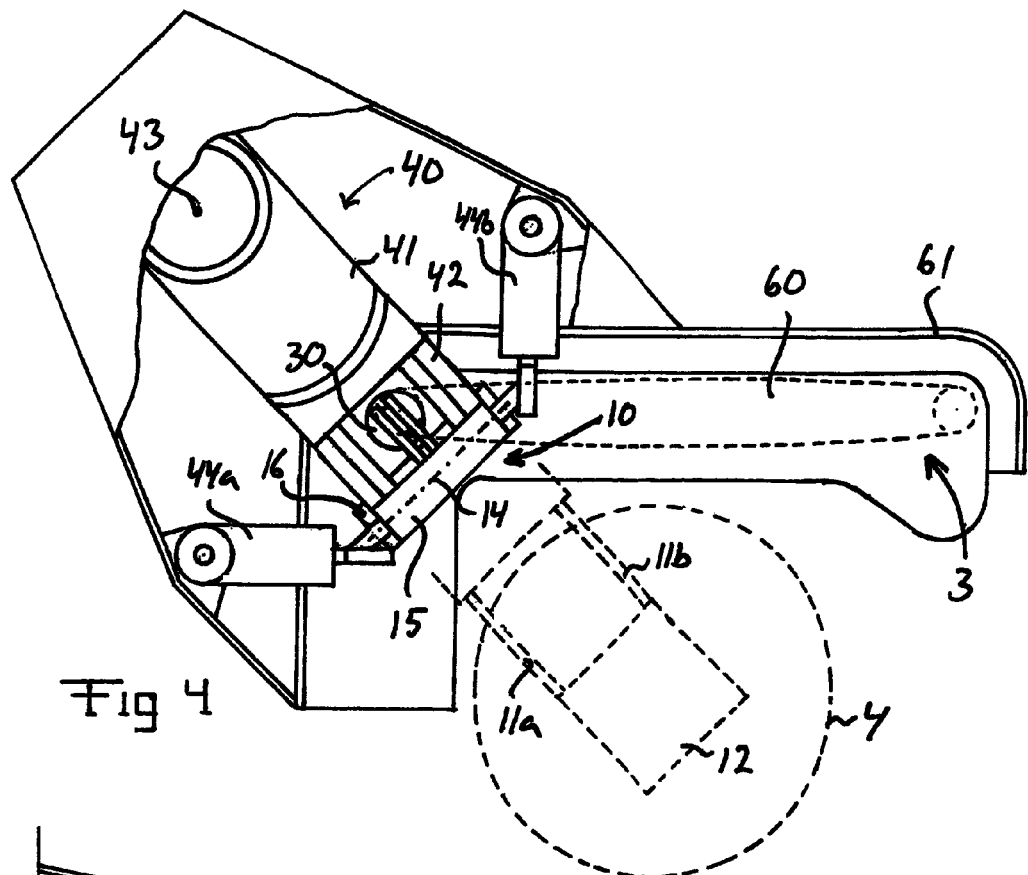
FIG. 4-6 show possible locations of a marking device in relation to the cutting device of a harvesting arrangement.
Figure 5:
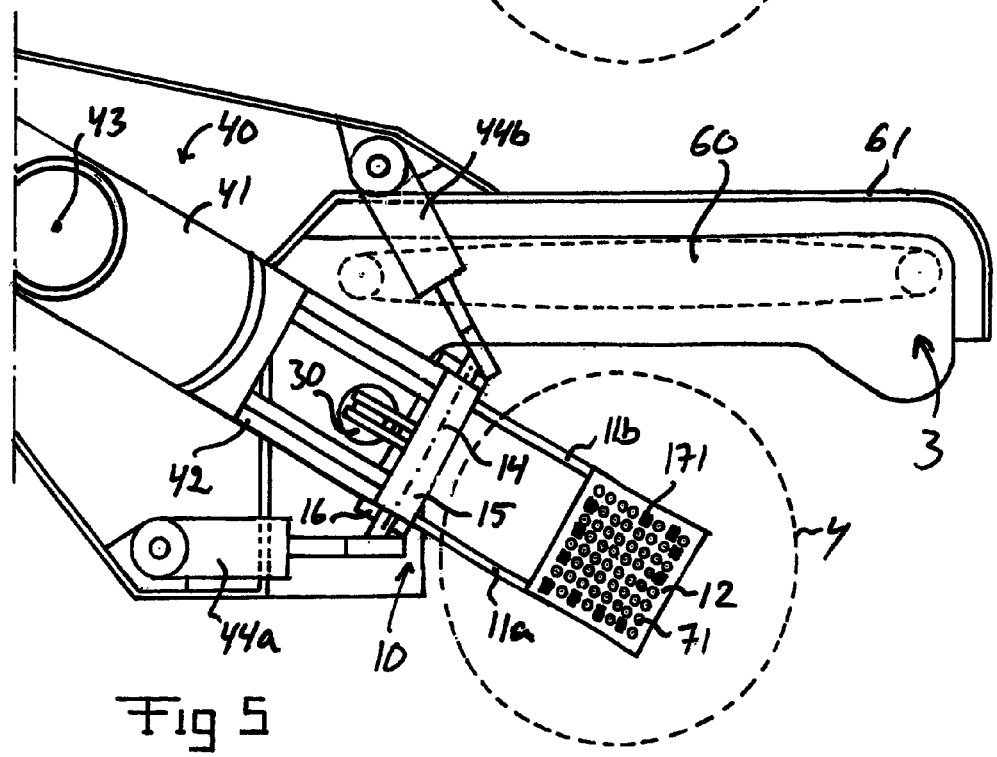

The marking device 10 comprises an electronic control unit for controlling the actuating elements 307. This electronic control 130 unit may be mounted in the regulating unit 80, as schematically illustrated in FIG. 3a.

The process of setting the positions of the regulating elements 100 will now be described with reference to FIGS. 13a-13d. In the starting position, the valve pins 220 of all the hydraulic valves 200 are in their retracted position and the hydraulic valves are closed (see FIG. 13a). In a first step, the valve pins 220 are all moved to their advanced position by means of the actuating elements 307 (see FIG. 13b) in order to open the hydraulic valves, whereupon the channels B of the above-mentioned second set of channels are pressurized so as to make sure that the pistons 302 and thereby the regulating elements 100 are all moved to their retracted position while allowing hydraulic fluid to flow out of the respective second chamber 305 through the associated hydraulic valve 200 and the channels A of the above-mentioned first set of channels. The valve pin 220 associated with a regulating element 100 that is to remain in the retracted position during the setting operation is then displaced from its advanced position to its retracted position by means of its actuating element 307, as illustrated in FIG. 13c. The valve pin 220 associated with a regulating element 100 that is to be moved to its advanced position is remained in its advanced position. Thereafter, the channels A of the first set of channels are pressurized so as to allow hydraulic fluid to flow through each open hydraulic valve 200 and into the associated second chamber 305 in order to move the associated piston 302 and regulating element 100 from the retracted position to the advanced position, as illustrated in FIG. 13c, while allowing hydraulic fluid to flow out of the first chamber 304 through the channels B of the second set of channels. When the piston 302 has reached its uppermost position in its bore 303, hydraulic fluid will be forced into the chamber 201 inside the sleeve 210 through the flow passage 202. The valve pin 220 will then be displaced from the advanced position to the retracted position by the hydraulic pressure in the chamber 201 and the valve will thereby be automatically closed, as illustrated in FIG. 13d. Thereby, the hydraulic valves 200 are all made to assume the above-mentioned starting position.

The marking device 10 may be provided with a spring-actuated releasing means 50 for facilitating the withdrawal of the marking elements 71 from a piece of wood hit by the striking head 12. In the embodiment illustrated in FIGS. 10a and 10b, the releasing means 50 is arranged in the striking head 12 and comprises a releasing member 51 displaceably mounted in a recess 52 in the striking head. In its normal advanced position, the releasing member 51 protrudes from the striking head 12 in the same direction as the marking elements 71, 171. The releasing member 51 is urged into this advanced position (see FIG. 10a) by a spring 53 arranged in the recess 52. When the striking head 12 hits against a piece of wood 4, the releasing member 51 will come into contact with the piece of wood 4 and is thereby pushed from the advanced position to a retracted position (see FIG. 10b) against the action of the spring 53. The spring 53 will then urge the releasing member 51 back into its advanced position and thereby tend to move the striking head 12 backwards out of contact with the piece of wood 4.

The mark applied by the respective marking member 71, 171 could for instance be an indentation or a dot of paint or ink. In the illustrated embodiments, the marking elements 71, 171 of the marking members 70 are arranged to apply a marking by stamping or punching on the surface of a piece of wood to be marked when the striking head 12 hits against said surface. In this case, the respective marking element 71 is in its active marking position arranged to penetrate into the surface of a piece of wood hit by the striking head 12 so as to achieve an indentation in the surface, and in its inactive position prevented from penetrating into the surface of a piece of wood hit by the striking head. The respective marking element 71 may have a rounded outer end so as to facilitate the withdrawal of the marking element from the surface of an object hit by the striking head 12. The striking head 12 could also be provided with means for attaching an information carrier to a piece of wood to be marked. Such an information carrier could be provided with a code marking and/or any other desired information and could for instance consist of an RFID-tag (RFID=Radio-frequency identification), for instance in the form of a transponder, an electronic chip, a label etc. The RFID-tags may for instance be provided on a reel actuated by suitable feeding means provided in the regulating unit 80. The striking head 12 may also be provided with a marking member in the form of a valve which is designed to emit paint or ink when the striking head 12 hits against the surface of a piece of wood so as to thereby apply a dot of paint or ink on the surface of the piece of wood.

Figure 11:
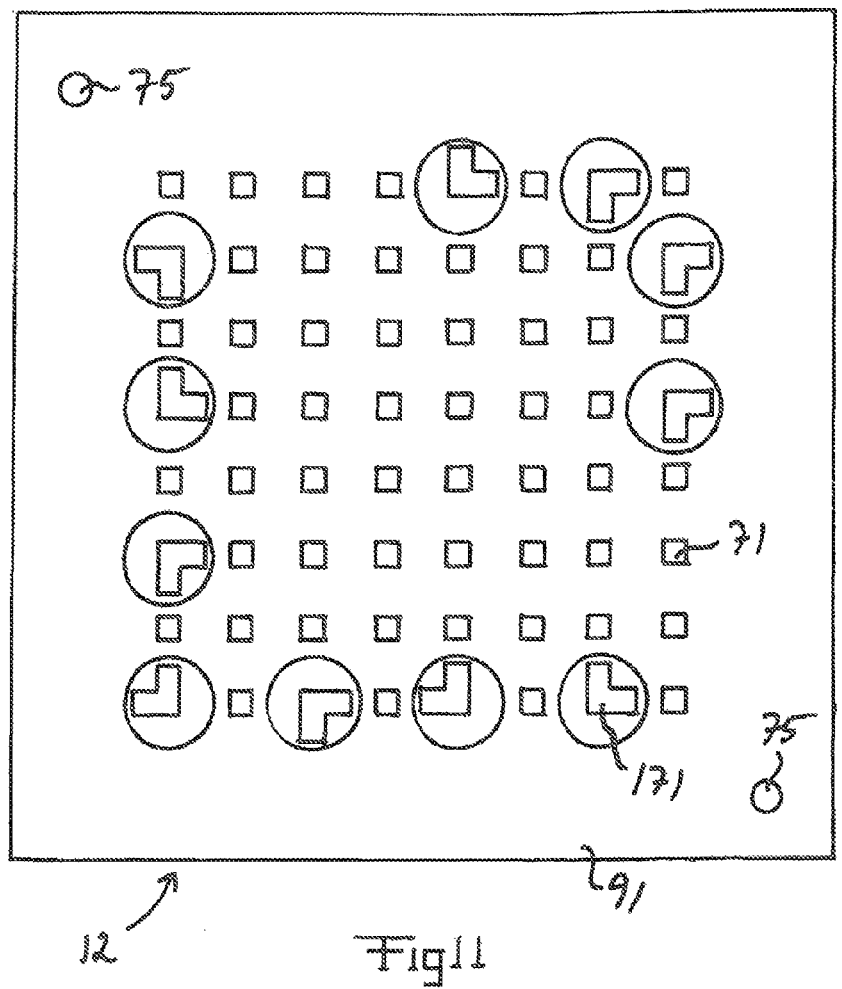
FIG. 11 is a planar view of a striking head included in a marking device according to an embodiment of the present invention.
Figure 17:
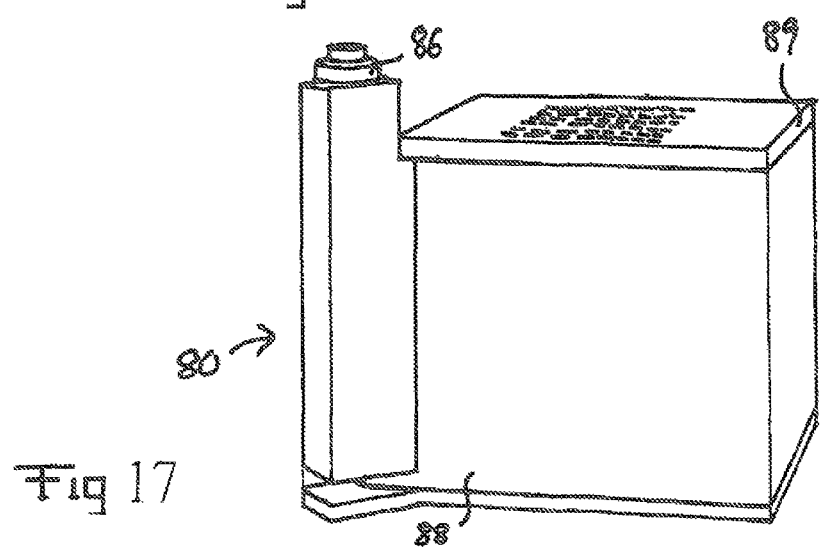
FIG. 17 is a schematic perspective view of a regulating unit included in a marking device according to an embodiment of the present invention.
Figure 15A:
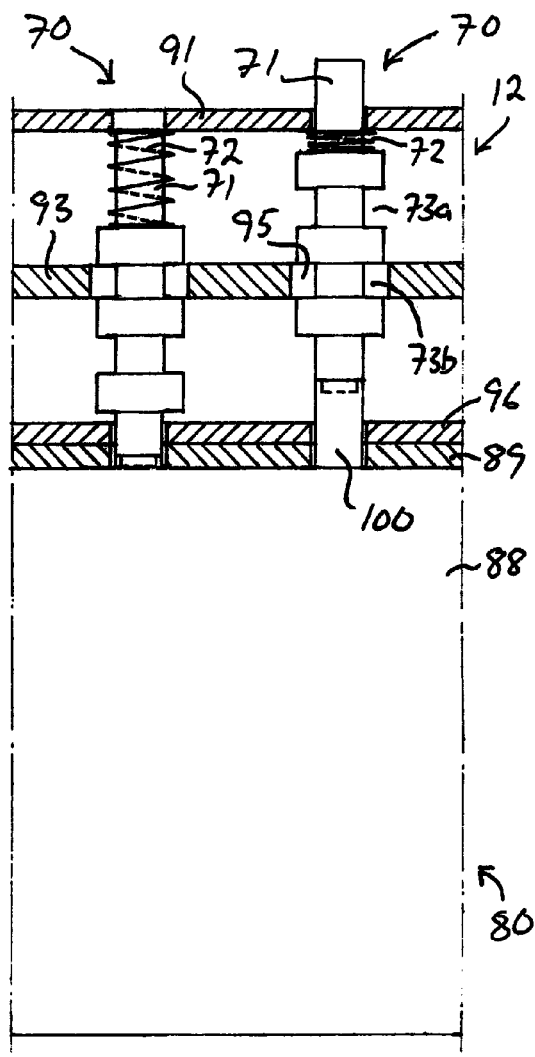
FIGS. 15a and 15b are schematic, partly cut lateral views of parts included in a marking device according to an embodiment of the present invention, with a locking plate of the marking device shown in two different positions.
Figure 15B:
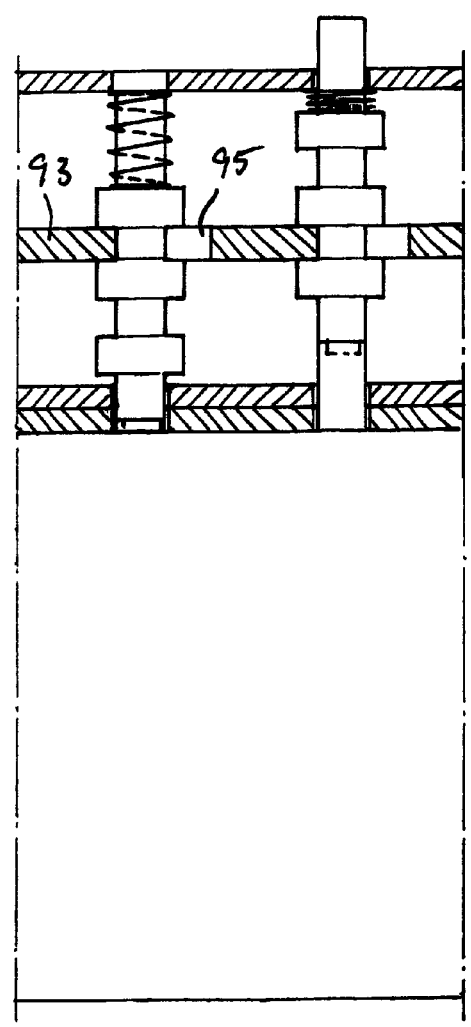

The marking elements 71, 171 are suitably arranged in a matrix, as illustrated in FIG. 11, so as to be capable of applying a matrix code on a piece of wood to be marked. In the example illustrated in FIG. 11, the marking elements 71, 171 are arranged in a matrix having eight columns and eight rows. A matrix having six columns and six rows could also be a favourable alternative. In the illustrated example, the centre of the respective rotatable marking element 171 constitutes a fixed point in the matrix pattern.

The striking head 12 is with advantage provided with at least two fixed control elements 75 projecting from the front plate 91 of the striking head 12. These control elements 75 are arranged on opposite sides of the matrix of marking elements 71, 171 and are intended to apply a control mark on the surface of a piece of wood to be marked when the striking head 12 hits against said surface. When a piece of wood has been correctly marked, all control marks should appear on the piece of wood. Thus, the control marks can be used to indicate whether or not a complete code marking has been applied on a marked piece of wood.

The invention is of course not in any way restricted to the embodiments described above. On the contrary, many possibilities to modifications thereof will be apparent to a person with ordinary skill in the art without departing from the basic idea of the invention such as defined in the appended claims. The rotational position of the respective rotatable marking element could for instance be controlled by means of an electric stepping motor.

The invention claimed is:

1. A marking device (10) for applying a code marking on a piece of wood, the marking device (10) comprising a matrix of marking elements (71, 171) which applies a mark on a piece of wood and varies the code marking to be applied by the marking device 10, wherein
said matrix comprises a rotatable marking element (171) which is arranged to apply a rotationally unsymmetrical mark on a piece of wood and is shiftable between different rotational positions in relation to the other marking elements (71) of the matrix.

2. A marking device according to claim 1, wherein said rotatable marking element (171) is rotatable about its longitudinal axis.

3. A marking device according to claim 1, wherein said rotatable marking element (171) is arranged to apply a T-shaped or L-shaped mark on a piece of wood.

4. A marking device according to claim 1, wherein said rotatable marking element (171) is arranged to apply a mark on a piece of wood by stamping or punching.

5. A marking device according to claim 1, wherein said rotatable marking element (171) is arranged to be rotated incrementally with a given rotational angle between each step.

6. A marking device according to claim 1, wherein the marking device (10) comprises a set of marking members (70) where each marking member comprises a marking element (71) which is shiftable between an active marking position, in which the marking element (71) is arranged to apply a mark on a piece of wood, and an inactive position, in which the marking element (71) is prevented from applying a mark on a piece of wood.

7. A marking device according to claim 6, wherein the respective marking element (71) of the marking members (70) in said set is displaceably mounted and is advanced when it is in the active position and retracted when it is in the inactive position.

8. A marking device according to claim 6, wherein the respective marking element (71) of the marking members (70) in said set is arranged to apply a mark on a piece of wood by stamping or punching.

9. A marking device for applying a code marking on a piece of wood, the marking device (10) comprising several adjustable marking members, each of which comprising a marking element which is capable of applying a mark on a piece of wood and which is shiftable between different positions or states to allow a variation of the code marking to be applied by the marking device, wherein
at least one of said marking members (170) comprises a rotatable marking element (171), which is arranged to apply a rotationally unsymmetrical mark on a piece of wood and which is settable in different rotational positions in relation to the marking elements of the other marking members;
the marking device (10) comprises a striking arm (11) provided with a striking head (12) at its outer free end and actuating means (30, 30') for actuating the striking arm (11), the striking arm (11) being pivotable about an axis of rotation (14) under the effect of the actuating means (30, 30') from a resting position to a striking position so as to thereby allow the striking head (12) to hit against a piece of wood to be marked; and
the marking members (70, 170) are mounted to the striking head (12).

10. A marking device according to claim 9, wherein
the marking device (10) comprises a regulating unit (80), by which the marking elements (71, 171) are shiftable between their different positions or states; and
the striking head (12) and regulating unit (80) are movable in relation to each other into a setting position in which the regulating unit (80) and the striking head (12) are in contact with each other to allow the regulating unit to set the positions or states of the marking elements (71, 171).

11. A marking device according to claim 10, wherein the regulating unit (80) is separated from the striking arm (11) to be unaffected by the pivotal movement of the striking arm (11) when the striking arm (11) is pivoted from the resting position to the striking position.

12. A harvesting arrangement for tree harvesting comprising gripping members (2) for holding a tree trunk and a cutting device (3) for crosscutting a tree trunk held by the gripping members (2), wherein
the harvesting arrangement (1) comprises a marking device (10) according to claim 1 for applying a code marking on the end surface of a crosscut end of a tree trunk held by the gripping members (2).

13. A marking device according to claim 1, additionally comprising
a rotatable sleeve (172) on which the marking element (171) is removably mounted to be fixed in rotation therewith, said rotatable sleeve (172) being rotatably mounted but axially fixed in a striking head (12),
a cylindrical guide member (173) received inside said rotatable sleeve (172) and axially displaceably mounted but rotatably fixed in the striking head (12),
a pin (174) fixedly connected to said cylindrical guide member (173) and extending away from the marking element (171),
a spring (175) mounted between the marking element (171) and the guide member (173),
a guide track (176) extending circumferentially around the guide member (173), and
at least one projection (177) positioned on an inner surface of the guide sleeve (172) and received in the guide track (176).

14. A marking device according to claim 1, additionally comprising a regulating unit (80) arranged for shifting the marking element (71, 171) between active and inactive positions, said regulating unit (80) comprising
regulating elements (100) each slidably arranged within a housing (88) of the regulating unit (80) and associated with each marking element (71, 171), with the regulating elements (100) each arranged to project through opposite holes in front (89) and rear (96) plates of the regulating unit housing (88), an actuating element (307) and a hydraulic valve (200) arranged to control displacement of each said regulating element (100), the hydraulic valve (200) comprising a sleeve (210) having a closed end (211) and an open end (212), and a pin (220) received in the open end (212), defining a chamber (201) between the closed end (211) and an upper end (221) of the pin (220) and having a radially-extending through hole (222), the pin (220) being axially-displaceable between an extended position in which the through hole (222) is aligned with a radially-extending through hole (213) in the sleeve (210), a recess (223) arranged on an outer surface of the pin (220) between the radially-extending through hole (222) and upper end (221) thereof, the sleeve (210) comprising a recess (214) extending between the through hole (213) and upper end (211) thereof, and the valve (200) forming part of a hydraulic arrangement comprising a piston (302) slidably mounted in a bore (303) of a frame (301) in the hydraulic arrangement and separating two chambers (304, 305) in the bore (303) on opposite sides of the piston (302).

15. A marking device according to claim 1, additionally comprising means for individually locking each said marking element (71, 171) in extended or retracted position and comprising a laterally-displaceable locking plate (93) to axial direction of movement of each said locking element (71, 171) and comprising a series of holes (95) through which each said marking element (71, 171) is axially-movable between extended and retracted positions, and each said locking element (71, 171) comprising adjacent annular recesses (73*a*, 73*b*) such that said locking plate (93) is laterally-movable to lock said respective locking element (71, 171) in either the extended or retracted position by contacting a respective annular recess (73*a*, 73*b*).

16. A marking device according to claim 1, comprising a planar plate (91) upon which said matrix of marking elements (71, 171) is arranged, said planar plate (91) provided with a grid of holes arranged to accommodate each said marking element (71, 171).

* * * * *